United States Patent
Hou et al.

(10) Patent No.: US 11,195,300 B2
(45) Date of Patent: *Dec. 7, 2021

(54) SMOOTHNESS CONSTRAINT FOR CAMERA POSE ESTIMATION

(71) Applicant: TuSimple, Inc., San Diego, CA (US)

(72) Inventors: Xiaodi Hou, San Diego, CA (US); Xue Mei, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/717,937

(22) Filed: Dec. 17, 2019

(65) Prior Publication Data

US 2020/0126255 A1    Apr. 23, 2020

Related U.S. Application Data

(63) Continuation of application No. 15/996,292, filed on Jun. 1, 2018, now Pat. No. 10,565,728.

(51) Int. Cl.
*G06T 7/73* (2017.01)
*G06T 7/246* (2017.01)
*G05D 1/02* (2020.01)

(52) U.S. Cl.
CPC .............. *G06T 7/74* (2017.01); *G06T 7/248* (2017.01); *G05D 1/0246* (2013.01); *G05D 2201/0213* (2013.01); *G06T 2207/30244* (2013.01)

(58) Field of Classification Search
None
See application file for complete search history.

(56) References Cited

U.S. PATENT DOCUMENTS

| | | |
|---|---|---|
| 6,975,923 B2 | 12/2005 | Spriggs |
| 7,742,841 B2 | 6/2010 | Sakai et al. |
| 8,346,480 B2 | 1/2013 | Trepagnier et al. |
| 8,706,394 B2 | 4/2014 | Trepagnier et al. |
| 8,718,861 B1 | 5/2014 | Montemerlo et al. |
| 8,983,708 B2 | 3/2015 | Choe et al. |
| 9,088,744 B2 | 7/2015 | Grauer et al. |
| 9,214,084 B2 | 12/2015 | Grauer et al. |
| 9,219,873 B2 | 12/2015 | Grauer et al. |
| 9,282,144 B2 | 3/2016 | Tebay et al. |

(Continued)

*Primary Examiner* — Matthew C Bella
*Assistant Examiner* — Brian D Shin
(74) *Attorney, Agent, or Firm* — Paul Liu; Perkins Coie, LLP

(57) ABSTRACT

Disclosed are devices, systems and methods for incorporating a smoothness constraint for camera pose estimation. One method for robust camera pose estimation includes determining a first bounding box based on a previous frame, determining a second bounding box based on a current frame that is temporally subsequent to the previous frame, estimating the camera pose by minimizing a weighted sum of a camera pose function and a constraint function, where the camera pose function tracks a position and an orientation of the camera in time, and where the constraint function is based on coordinates of the first bounding box and coordinates of the second bounding box, and using the camera pose for navigating the vehicle. The method may further include generating an initial estimate of the camera pose is based on a Global Positioning System (GPS) sensor or an Inertial Measurement Unit (IMU).

20 Claims, 5 Drawing Sheets

(56) References Cited

U.S. PATENT DOCUMENTS

| | | |
|---|---|---|
| 9,317,033 B2 | 4/2016 | Ibanez-guzman et al. |
| 9,347,779 B1 | 5/2016 | Lynch |
| 9,390,506 B1 * | 7/2016 | Asvatha Narayanan ................... G06T 7/194 |
| 9,418,549 B2 | 8/2016 | Kang et al. |
| 9,494,935 B2 | 11/2016 | Okumura et al. |
| 9,507,346 B1 | 11/2016 | Levinson et al. |
| 9,513,634 B2 | 12/2016 | Pack et al. |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,599,712 B2 | 3/2017 | Van Der Tempel et al. |
| 9,600,889 B2 | 3/2017 | Bolsson et al. |
| 9,602,807 B2 | 3/2017 | Crane et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,690,290 B2 | 6/2017 | Prokhorov |
| 9,701,023 B2 | 7/2017 | Zhang et al. |
| 9,712,754 B2 | 7/2017 | Grauer et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,739,609 B1 | 8/2017 | Lewis |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 2002/0191003 A1 * | 12/2002 | Hobgood ............ H04N 5/23299 345/633 |
| 2014/0037136 A1 * | 2/2014 | Ramalingam ............ G06T 7/579 382/103 |
| 2014/0085545 A1 * | 3/2014 | Tu ........................ G06K 9/6292 348/659 |
| 2016/0334230 A1 | 11/2016 | Ross et al. |
| 2017/0243352 A1 * | 8/2017 | Kutliroff ............... G06T 19/006 |
| 2018/0307916 A1 | 10/2018 | Satzoda |

\* cited by examiner

SMOOTHNESS CONSTRAINT FOR CAMERA POSE ESTIMATION

CROSS-REFERENCE TO RELATED APPLICATION

This patent document claims the benefit of U.S. patent application Ser. No. 15/996,292, filed on Jun. 1, 2018, which is incorporated herein by reference in its entirety for all purposes.

TECHNICAL FIELD

This document relates to camera position and orientation estimation based on captured images.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services. One of the components of autonomous driving, which ensures the safety of the vehicle and its passengers, as well as people and property in the vicinity of the vehicle, is reliable navigation. Reliably navigating in urban environments requires precise location information of cars and obstacles adjacent to the vehicle.

SUMMARY

Disclosed are devices, systems and methods for robust camera pose estimation. This may be achieved by incorporating a moving object smoothness constraint into a known camera pose estimation objective function, wherein the moving object smoothness constraint is based on object detection and tracking results.

In one aspect, the disclosed technology can be used to provide a method for robust camera pose estimation. This method, implemented in a vehicle, may include determining a first bounding box based on a previous frame, determining a second bounding box based on a current frame that is temporally subsequent to the previous frame, estimating the camera pose by minimizing a weighted sum of a camera pose function and a constraint function, where the camera pose function tracks a position and an orientation of the camera in time, and where the constraint function is based on coordinates of the first bounding box and coordinates of the second bounding box, and using the camera pose for navigating the vehicle.

In another exemplary aspect, the above-described methods are embodied in the form of processor-executable code and stored in a computer-readable program medium.

In yet another exemplary aspect, devices that are configured or operable to perform the above-described methods are disclosed.

The above and other aspects and features of the disclosed technology are described in greater detail in the drawings, the description and the claims.

DETAILED DESCRIPTION

Camera pose estimation is an important component for vision-based autonomous driving which is used to infer the location of the moving objects by backprojecting the detection results in the image to the 3D world. The pose of a camera is its position and orientation with respect to a referenced coordinate system. In some embodiments, the pose includes a three-dimensional orientation and a three-dimensional translation. In an example, the orientation of an adjacent vehicle or object with respect to a host vehicle may be evolving, and may continuously need to be tracked in the frame of reference of the host vehicle, e.g., in its reference coordinate system, to ensure the safe driving and maneuvering of the host vehicle.

In a vehicular system, the camera pose changes as a function of time due to the relative movements of the host and adjacent vehicles that must be accounted for, in the reference coordinate system of the host vehicle, to ensure that estimates of the relative locations of adjacent vehicles and obstacles are accurate. Unreliable estimates of the camera pose may prove very detrimental for autonomous driving and navigation. Embodiments of the disclosed technology advantageously provide a moving object smoothness constraint in addition to a known camera pose estimation objective function to improve the robustness of the pose estimation by incorporating object detection and tracking results. For example, the projection error between the current detection results and the projection of the moving object from tracking is minimized.

Existing systems may directly use the estimate of the camera pose to determine the vehicle position, as well as the positions/locations of adjacent vehicles. However, this approach is very sensitive to the raw estimate of the camera pose, which may be subject to many sources of error. Embodiments of the disclosed technology adopt an approach that relies on regularization, which improves the robustness of the resulting estimate.

The regularization term (also referred to as the constraint function in this document) minimizes the perturbations in a solution to an optimization problem. In this case, the resulting camera pose estimate is less susceptible to perturbations that may result from a variety of factors (e.g. host vehicle movement, road vibrations, calibration errors, etc.) since it relies on the location of an adjacent vehicle. More specifically, the temporal correlation or continuity of the location of the adjacent vehicle is used to ensure that perturbations in the camera pose estimate may be eliminated. In other words, adding the regularization term assumes that the location of an adjacent vehicle will not change dramatically between two subsequent frames.

This patent document provides an exemplary mathematical framework for adding the regularization term to the camera pose objective function, and discusses its implementation in the safe navigation of vehicles, both fully-autonomous and semi-autonomous.

Figure 1:
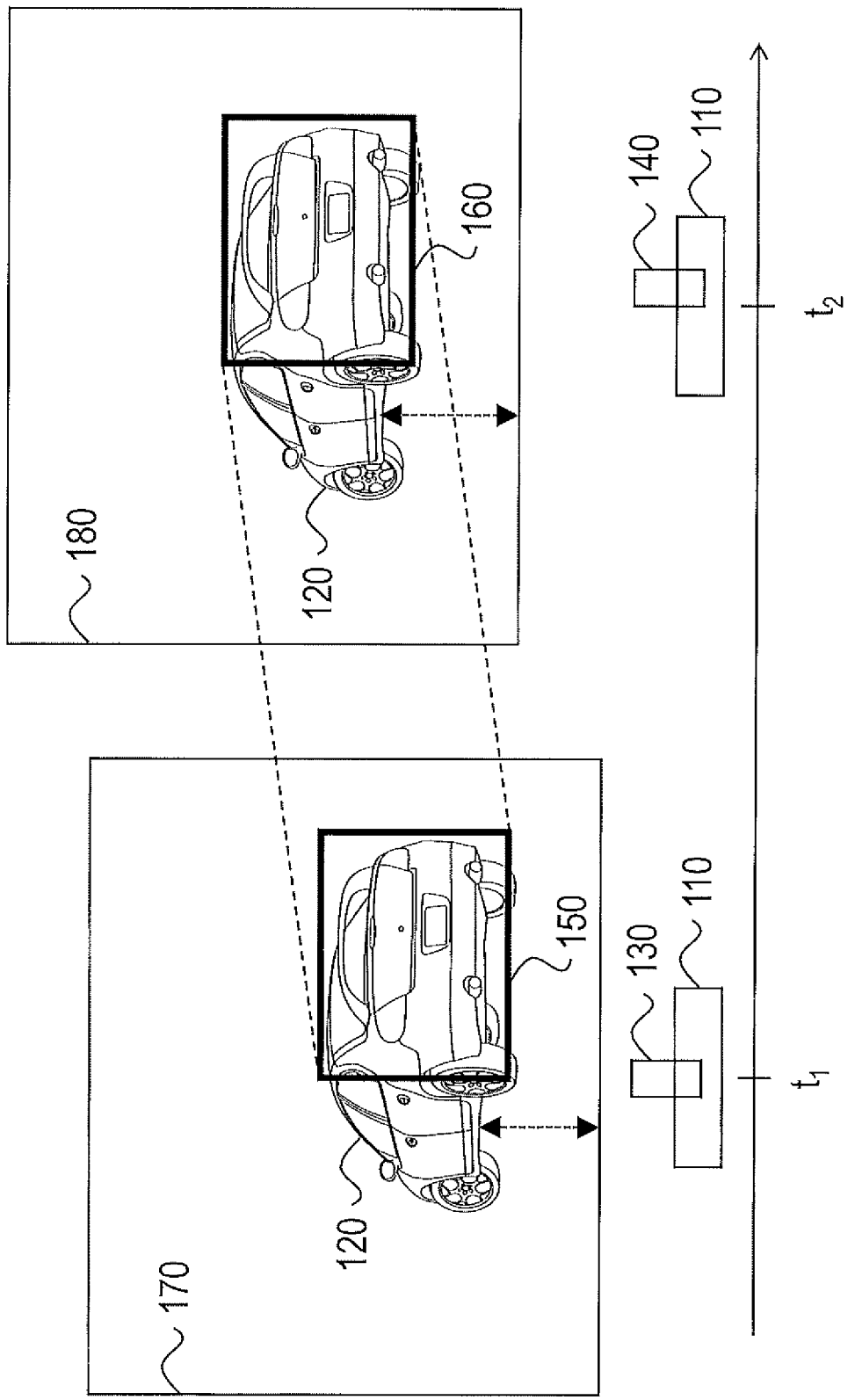
FIG. 1 shows a simplified timeline for an example of robust camera pose estimation.

FIG. 1 shows a simplified timeline for robust camera pose estimation. FIG. 1 shows the camera pose and frames captured by the camera at two different times $t_1$ and $t_2$. As shown in FIG. 1, a camera rack 110 is used as a mount for the camera 130, which is in a first position at time $t_1$. The frame 170 corresponding to (or image captured by) the camera in the first position includes a car 120. In some embodiments, the rear of the car has been identified by a first bounding box 150. In this example, the bounding box is depicted as having a rectangular shape. However, in various embodiments, different shapes may be used. For example, in some cases, the bounding box may be circular or elliptical (or approximated by a many-cornered polygon) so as to better match contours of cross-section of an automobile when seen from behind.

At a later time $t_2 > t_1$, the camera is in a different (or second) pose 140 with respect to the first position of the camera 130. In some embodiments, the difference in the camera pose may be due to the movement of the host vehicle. The camera in the second pose 140 at time $t_2$ captures its own image (or frame) 180 of the car 120. A second bounding box 160 identifies the rear of the car in the second frame, in which the car has moved relative to its position in the first frame 170. In other words, the bounding box for the same vehicle is tracked across different frames. In some embodiments, the car 120 is being tracked with high confidence by the tracking system in the vehicle that is implementing the disclosed technology.

The dashed line in FIG. 1 pictorially depicts a "possible camera pose shift" that corresponds to a change in the x-y position and/or the angle of viewing of the rear of the car by the camera at the times $t_1$ and $t_2$. In an example, the change may be due to the relative movement of the object (in this case, the rear of a car) relative to the camera on the host vehicle. In general, it may not be known by simple inspection of the two images as depicted in FIG. 1, whether the change in the object's visual appearance and location is due to a change in the camera pose, or due to the relative movement of the object with respect to the camera, or both.

In automatic navigation, to control a vehicle's speed and bearing, it is useful to obtain a quantitative estimate of an object's movement (e.g., is the next car now closer or farther than it was at a previous time), and also camera movement (to avoid un-necessarily accelerating or braking the vehicle based on camera pose fluctuations).

In some embodiments, the first bounding box 150 and the second bounding box 160 (which correspond to the same adjacent car 120 at different times), and the assumption that the car 120 could not have moved (or shifted locations) dramatically between times $t_2$ and $t_2$, may be used to constrain the camera movement between the two times when estimating the position and orientation of the camera. More generally, the bounding boxes from temporally different frames may be used to smooth the estimation of the camera pose, among other uses.

Figure 2:
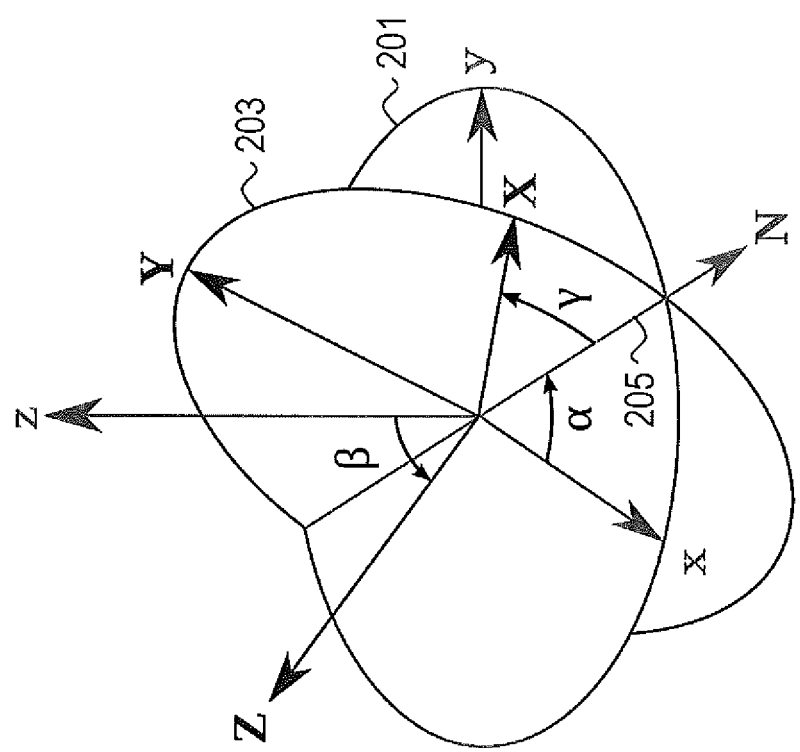
FIG. 2 shows an example of a coordinate system for camera pose estimation.

FIG. 2 shows an example coordinate system that may be used in camera pose estimation. As shown therein, three angles ($\alpha$, $\beta$ and $\gamma$) may be used to represent the orientation of an object with respect to a fixed coordinate system. As shown in FIG. 2, the angles may be used to geometrically relate the axes of the original frame 201 that are denoted $\{x, y, z\}$, the axes of the rotated frame 203 that are denoted $\{X, Y, Z\}$, and the N-axis 205, which is defined as the intersection of the planes xy and XY. In other words, and in an example, the camera pose may be defined, estimated and tracked using Euler angles.

In some embodiments, the input image at time t is referred to as $I_t: \Omega \to \mathbb{R}^3$ where $\Omega \subset \mathbb{R}^2$ is the image domain. The corresponding 6 degree-of-freedom (DoF) camera pose in the local navigation coordinates (e.g., Euler angles, Lie algebra SO(3), unit quaternions, rotation matrices, and so on) may be represented as a 3D rigid body transformation matrix $P_t \in SE(3)$. In an example, the camera pose $$P = \begin{bmatrix} R & T \\ 0 & 1 \end{bmatrix} \in SE(3)$$

is parameterized with the 6×1 vector $\xi \in se(3)$, where R is a 3×3 rotation matrix, T is a translation, and se(3) is the Lie algebra corresponding to the Special Euclidean group SE(3). The function G: se(3)→SE(3) is defined as a function to form the rigid body transformation matrix. A 2D point in an image is denoted as $x = (u, v)^T \in \Omega$. Its corresponding homogeneous vector is defined as $\dot{x} = (u, v, 1)^T$, including de-homogenization by $\pi(X) = (x/z, y/z)^T$.

Based on the framework described above, an exemplary algorithm for incorporating a smoothness constraint into a known camera pose estimation objective function is defined as:

(1) The bottom center point of the detected bounding box of the moving object in a previous frame can be backprojected to the 3D world to get its 3D position p on the ground using a terrain map and the estimated camera pose.

(2) A plane passing p and its normal is the road direction at p are constructed. The four corners of the detected bounding box detection are backprojected and intersect with the plane. Thus, the four corners of the rear bounding box of the moving object in the 3D world may be determined.

(3) Tracking of the moving object is used to predict the 3D position of the four corners of the bounding box in the current frame.

(4) The camera pose is computed by minimizing the sum of an objective function $f(\xi)$ and the moving object smoothness constraint, $$\arg\min_{\xi} f(\xi) + \lambda \sum_i \sum_{j=1}^{4} (x_{i,j} - \underline{x}_{i,j})^2,$$

where $\lambda$ is the coefficient balancing the known objective function $f(\xi)$ and the smoothness constraint, i iterates through the number of the moving objects included in the optimization function, j iterates through the four corners of the bounding box, $\underline{x}_{i,j}$ is the detection result in the current frame, $\dot{X}_{i,j}$ is the corresponding homogeneous vector of 3D corner point $X_{i,j}$, and $x_{i,j}$ is the projection of the predicted 3D position of the four corners in the current frame defined as follows:

$$x_{i,j} = \pi(K[I_{3\times3}|0]G(\xi)\dot{X}_{i,j}),$$

where K is a function based on intrinsic parameters of the camera. In some embodiments, the intrinsic parameters may include the focal length of the camera, the angle of view, and/or the center of the image captured by the camera.

In some embodiments, the smoothness constraint may be reinterpreted as $$\sum_{j=1}^{P} \left( \sum_i (x_{i,j} - \underline{x}_{i,j})^2 \right),$$

where, similar to the description above, i iterates through the number of the moving objects included in the optimization function, j iterates through the P corners of a generic bounding polygon, $\underline{x}_{i,j}$ is the detection result in the current frame, and $x_{i,j}$ is the projection of the predicted 3D position of the four corners in the current frame. Embodiments of the disclosed technology may use this alternate interpretation of the smoothness constraint to use detection and prediction results from different frames for different vehicles. For example, the $N^{th}$ and $(N-1)^{th}$ frames may be used to determine the bounding polygons for a first vehicle, whereas the $N^{th}$ and $(N-3)^{th}$ frames may be used to determine the bounding polygons for a second vehicle. Using different frames to compute the bounding boxes for different vehicles advantageously enables, for example, the disclosed implementations to account for different speeds of adjacent vehicles.

In some embodiments, the bounding polygon used for each of the tracked vehicles may be distinct. For example, a rectangular bounding box may be used a first set of vehicles, and a many-cornered polygon (e.g., 12-15 corners) may be used for a second set of vehicles. Using different polygons for different vehicles advantageously enables, for example, the disclosed implementations to account for different cross-sections of adjacent vehicles.

In some embodiments, the coefficient $\lambda$ that balances the known objective function and the smoothness constraint, as well as the confidence level cutoff (used to determine the number of moving objects included in the optimization function), may be selected based on experimental results. For example, different parameters may be tested, and the values that are robust and provide the best performance may be used. In other embodiments, the values may be updated periodically based on additional experimental results.

In an example, the objective function may be transformation from world coordinates to camera coordinates, and whose optimization generates the position and orientation of the camera, i.e. the camera pose.

Figure 3:
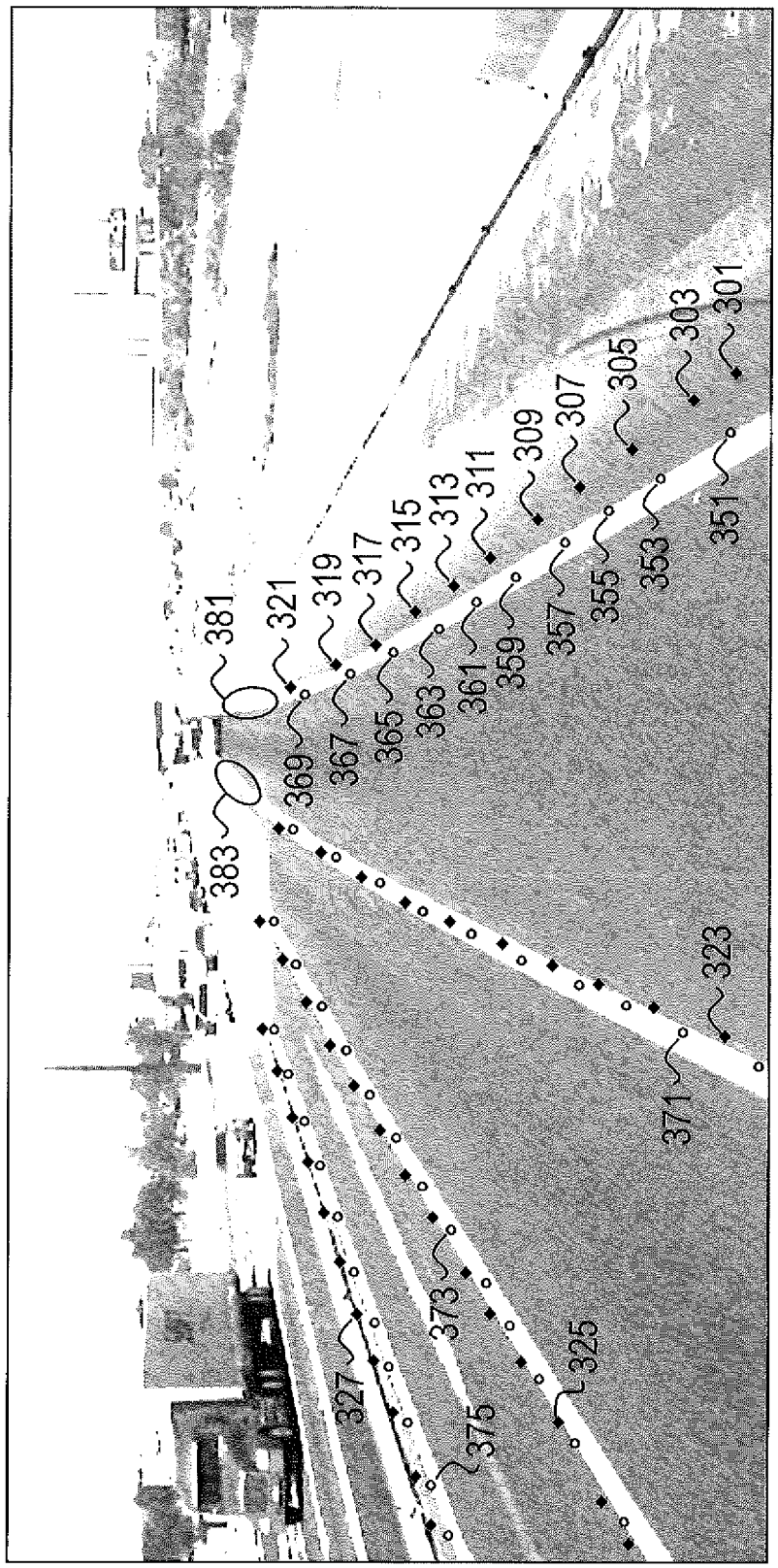
FIG. 3 shows an example of camera pose estimation.

FIG. 3 shows an example of camera pose estimation results based on optimizing the objective function. In some embodiments, a deep convolutional neural network performs the optimization of the objective function by minimizing the error from projected 3D points from a lane map and lane detection results. The initial projection results, which are depicted as solid diamonds (301, 303, . . . , 319, 321), are meant to map to the lane line 381, but as seen in FIG. 3, do not provide a robust match. The result of the optimization, which are depicted as circles (351, 353, . . . , 367, 369), provide a much more robust fit to the lane line 381. Similarly, the optimization results (solid diamonds beginning with 323, . . . ) provide a better fit to the lane line 383 than the initial projection results (circles beginning with 371, . . . ).

Figure 4:
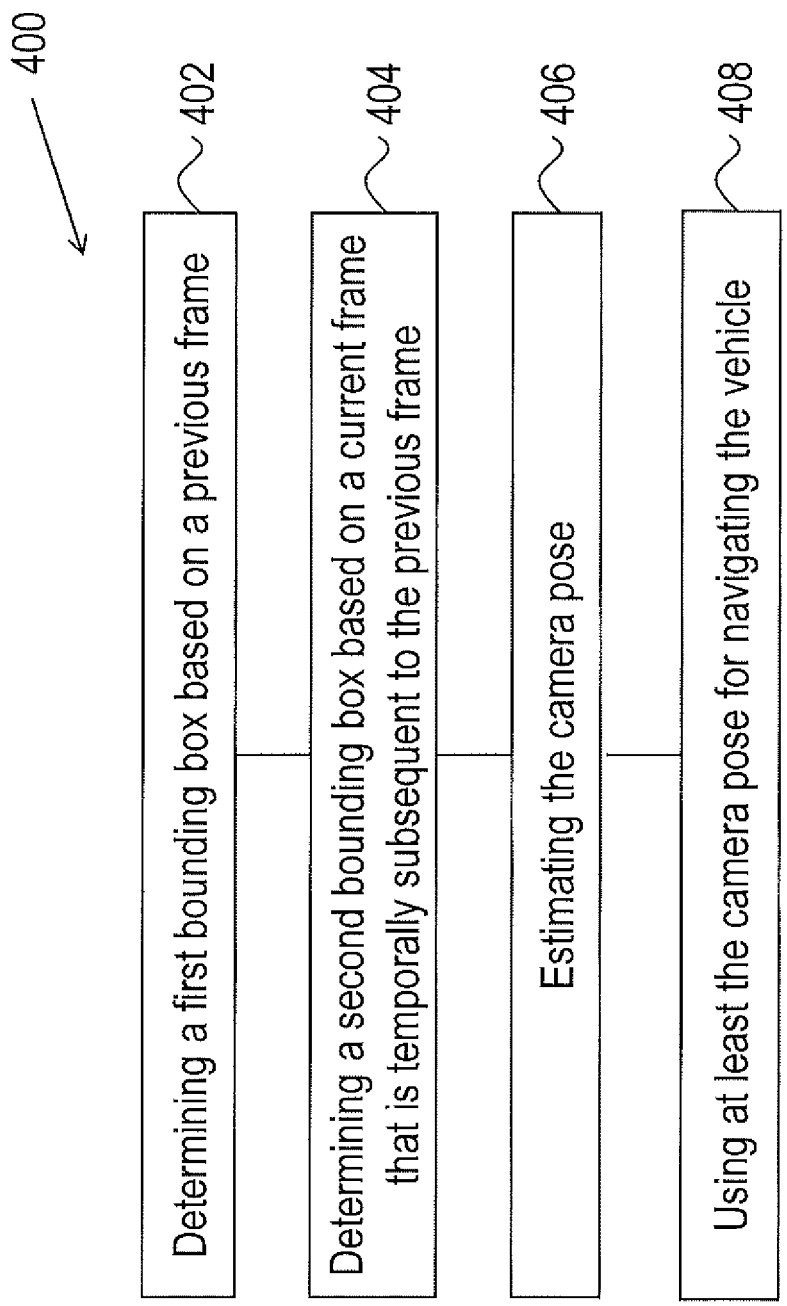
FIG. 4 shows a flowchart of an example method of incorporating a smoothness constraint for camera pose estimation.

FIG. 4 shows a flowchart of an example method, which may be implemented on a vehicle, of incorporating a smoothness constraint for camera pose estimation. The method 400 includes, at step 410, determining a first bounding box based on a previous frame. In some embodiments, and as described in step (1) of the algorithm, a first bounding box corresponding to the rear of a car in front of the vehicle may be determined based on the previous frame.

The method 400 includes, at step 420, determining a second bounding box based on a current frame that is temporally subsequent to the previous frame. In some embodiments, and as described in step (3) of the algorithm, a second bounding box may be determined based on the current frame. In some embodiments, the previous and current frames are selected based on a frame rate used by the camera. For example, consecutive frames from a camera with a slow frame rate (e.g., 24 or 25 frames/sec) may be used to determine the first and second bounding boxes. In another example, intermediate frames from a camera with a fast frame rate (e.g., 60 frames/sec) may be dropped between the frames used to determine the first and second bounding boxes. In some embodiments, the choice of frame rate and the selection of frames to determine the bounding boxes may be based on the available hardware and computational processing power, as well as prevalent traffic conditions.

In some embodiments, the first bounding box and the second bounding box may be of different sizes. For example, the method 400 may initially use consecutive bounding boxes of the same size. However, subsequently during operation, upon determining that the adjacent vehicle is moving away at a high speed and/or the camera is using a slow frame rate, the method 400 may select the second bounding box to be smaller than the first bounding box. Similarly, if the vehicle is closing up on the adjacent vehicle, then the second bounding box may be made larger than the first bounding box to fit the increasing size of the adjacent vehicle on the screen.

The method 400 may include generating an initial estimate of the camera pose, which may be used in the determination of the first and second bounding boxes. In some embodiments, the initial estimate of the camera pose may be based on a Global Positioning System (GPS) sensor and/or an Inertial Measurement Unit (IMU). Using a previous estimate of the camera pose as an initial estimate for subsequent processing is not recommended since vibrations of the camera rack (for example, due to the road surface) may induce a drift in the camera pose. Thus, the GPS sensor and IMU are independent measures that are used to generate the initial estimate.

The method 400 includes, at step 430, estimating the camera pose. In some embodiments, the camera pose may be estimated by minimizing a weighted sum of a camera pose function and a constraint function, where the camera pose function tracks a position and an orientation of the camera in time, and where the constraint function is based on coordinates of the first bounding box and coordinates of the second bounding box. In some embodiments, the camera pose may be estimated in a reference coordinate system of the host vehicle (e.g., Euler angles, Lie algebra SO(3), unit quaternions, rotation matrices, and so on).

In some embodiments, and in the context of networked V2V (vehicle-to-vehicle) communications, the estimation of the camera pose may be augmented by location and/or orientation information received from other vehicles. For example, an adjacent car may transmit its location to the host vehicle, and the location information may be used to refine the camera pose estimate. Embodiments of the disclosed technology may receive this location information in a coordinate system that is different from the reference coordinate system. In these scenarios, the location information will be converted to the coordinate system of the host vehicle, and then incorporated into the estimation of the camera pose.

In some embodiments, the camera pose estimate may be based on any road markings or signs that are available in the images/frames captured. For example, since the exact positions and orientations of freeway on-ramp and off-ramp signs are known, their locations may be used to improve the estimation of the camera pose. The optimization function (which is the weighted sum of a camera pose function and a constraint function) may be augmented by another function that incorporates the known location and/or orientation of fixed objects, thereby further reducing the estimation error.

In some embodiments, and as described in step (4) of the algorithm, the constraint function (or regularization term) may iterate over the number of the moving objects included in the optimization function. In other words, the bounding boxes corresponding to multiple vehicles may be incorporated in generating a robust estimate of the camera pose. In some embodiments, only those vehicles that are being tracked with high confidence (e.g., tracking error less than 5%) may be iterated over.

In some embodiments, the weight (e.g. $\lambda$) corresponding to the constraint function may be determined experimentally. In other embodiments, it may be based on previous estimates of the camera pose. In yet other embodiments, it may be based on the tracking error. More generally, this weight balances the known objective function and the smoothness constraint, and may be kept constant, or varied over different timescales.

The method 400 includes, at step 440, using at least the camera pose for navigating the vehicle. In some embodiments, the first and second bounding boxes may correspond to the rear of a car that is in front of the vehicle. Accurately determining the positions of adjacent cars based on a robust camera pose estimates enables the safe navigation of the vehicle.

In some embodiments, the acceleration, deceleration and/or steering of the vehicle may be based on the camera pose estimate, which corresponds to the location of adjacent vehicles. For example, a safe following distance from the vehicle directly in front of the host vehicle may be maintained based on the camera pose estimate.

Figure 5:
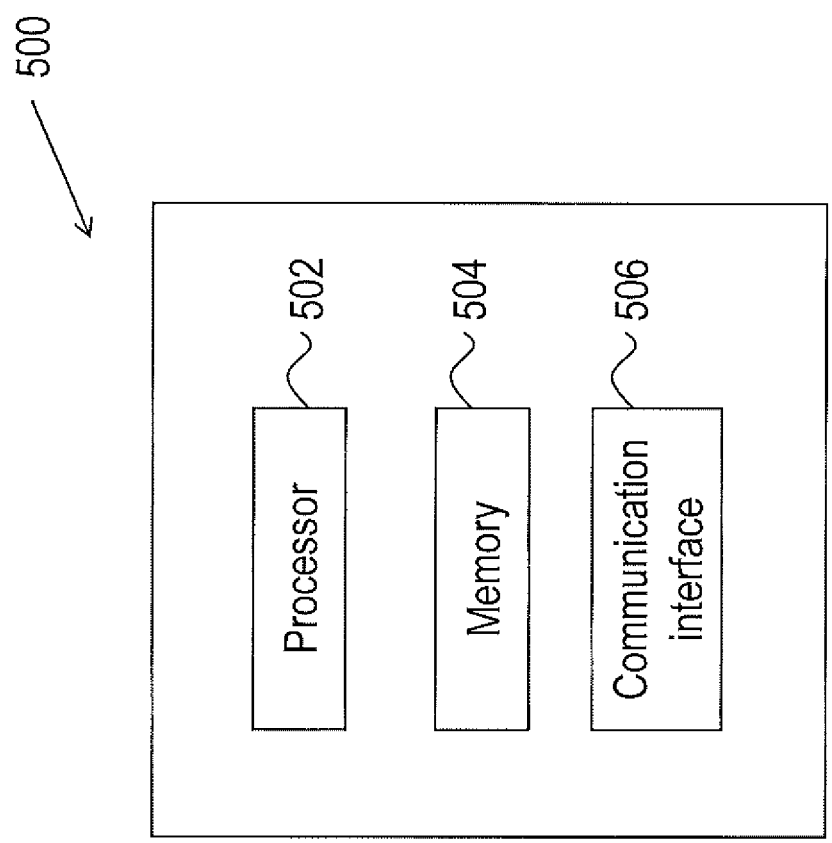
FIG. 5 shows an example of a hardware platform that can implement some techniques described in the present document.

FIG. 5 shows an example of a hardware platform 500 that can be used to implement some of the techniques described in the present document. For example, the hardware platform 500 may implement the method 400 or may implement the various modules described herein. The hardware platform 500 may include a processor 502 that can execute code to implement a method. The hardware platform 500 may include a memory 504 that may be used to store processor-executable code and/or store data. The hardware platform 500 may further include a communication interface 506. For example, the communication interface 506 may implement one or more of the communication protocols (LTE, Wi-Fi, and so on) described herein.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method, implemented in a vehicle, comprising:
   determining a first bounding contour based on a previous frame;
   determining a second bounding contour based on a current frame, wherein the current frame is temporally subsequent to the previous frame; and
   estimating a camera pose by minimizing a weighted sum of a camera pose function and a constraint function, wherein the camera pose function tracks a position and an orientation of a camera in time, and wherein the constraint function is based on coordinates of the first bounding contour and coordinates of the second bounding contour.

2. The method of claim 1, wherein determining the first and second bounding contours is based on an initial estimate of the camera pose.

3. The method of claim 2, wherein the initial estimate of the camera pose is based on at least a Global Positioning System (GPS) sensor or an Inertial Measurement Unit (IMU).

4. The method of claim 1, wherein a weight of the constraint function in the weighted sum is based on previous estimates of the camera pose.

5. An apparatus, comprising:
   a processor; and
   a memory comprising processor executable code, the processor executable code when executed by the processor causes the processor to:
   determine a first bounding contour based on a previous frame;
   determine a second bounding contour based on a current frame, wherein the current frame is temporally subsequent to the previous frame, and wherein the first bounding contour and the second bounding contour correspond to a position of a rear of an adjacent vehicle that is in front of a vehicle; and
   estimate a camera pose according to a camera pose function and a constraint function, wherein the camera pose function tracks a position and an orientation of a camera in time, and wherein the constraint function is based on coordinates of the first bounding contour and coordinates of the second bounding contour.

6. The apparatus of claim 5, wherein the first bounding contour is further determined based on intrinsic parameters of the camera, and wherein the intrinsic parameters of the camera include at least a focal length of the camera, an angle of view of the camera, or a center of an image captured by the camera.

7. The apparatus of claim 5, wherein the first bounding contour and the second bounding contour are rectangular, circular, elliptical, or polygonal.

8. The apparatus of claim 5, wherein at least one of the first bounding contour and the second bounding contour matches a contour of an adjacent vehicle shown in an image captured by the camera.

9. The apparatus of claim 5, wherein the processor executable code when executed by the processor further causes the processor to:
   use the camera pose for navigating a vehicle.

10. A non-transitory computer-readable medium storing a program causing a computer to execute a process, the process comprising:
    determining a first bounding contour based on a previous frame;
    determining a second bounding contour based on a current frame, wherein the current frame is temporally subsequent to the previous frame;
    estimating a camera pose according to a camera pose function and a constraint function, wherein the camera pose function tracks a position and an orientation of a camera in time, and wherein the constraint function is based on coordinates of the first bounding contour and coordinates of the second bounding contour; and
    using the camera pose for navigating a vehicle, comprising:
      obtaining a quantitative estimate of a movement of an adjacent vehicle; and
      obtaining a movement of the camera.

11. The non-transitory computer-readable medium of claim 10, wherein the camera pose comprises 6 degree-of-freedom (DoF) in a local navigation coordinate.

12. The non-transitory computer-readable medium of claim 10, wherein a coordinate of the camera pose function is transformable.

13. The non-transitory computer-readable medium of claim 10, wherein the process further comprises:
    determining a third bounding contour based on the previous frame; and
    determining a fourth bounding contour based on the current frame, wherein the constraint function is further based on coordinates of the third bounding contour and coordinates of the fourth bounding contour.

14. The non-transitory computer-readable medium of claim 13, wherein a first set of bounding contours include the first bounding contour and the second bounding contour, wherein a second set of bounding contours include the third bounding contour and the fourth bounding contour, and wherein a shape of the first set of bounding contours is different from a shape of the second set of bounding contours.

15. An apparatus, comprising:
    a processor; and
    a memory comprising processor executable code, the processor executable code when executed by the processor causes the processor to:
    determine a first bounding contour based on a previous frame;
    determine a second bounding contour based on a current frame, wherein the current frame is temporally subsequent to the previous frame; and
    estimate a camera pose by minimizing a weighted sum of a camera pose function and a constraint function, wherein the camera pose function tracks a position and an orientation of a camera in time, and wherein the constraint function is based on coordinates of the first bounding contour and coordinates of the second bounding contour.

16. A non-transitory computer-readable medium storing a program causing a computer to execute a process, the process comprising:
determining a first bounding contour based on a previous frame;
determining a second bounding contour based on a current frame, wherein the current frame is temporally subsequent to the previous frame; and
estimating a camera pose by minimizing a weighted sum of a camera pose function and a constraint function, wherein the camera pose function tracks a position and an orientation of a camera in time, and wherein the constraint function is based on coordinates of the first bounding contour and coordinates of the second bounding contour.

17. A method, implemented in a vehicle, comprising:
determining a first bounding contour based on a previous frame;
determining a second bounding contour based on a current frame, wherein the current frame is temporally subsequent to the previous frame, and wherein the first bounding contour and the second bounding contour correspond to a position of a rear of an adjacent vehicle that is in front of the vehicle; and
estimating a camera pose according to a camera pose function and a constraint function, wherein the camera pose function tracks a position and an orientation of a camera in time, and wherein the constraint function is based on coordinates of the first bounding contour and coordinates of the second bounding contour.

18. A non-transitory computer-readable medium storing a program causing a computer to execute a process, the process comprising:
determining a first bounding contour based on a previous frame;
determining a second bounding contour based on a current frame, wherein the current frame is temporally subsequent to the previous frame, and wherein the first bounding contour and the second bounding contour correspond to a position of a rear of an adjacent vehicle that is in front of a vehicle; and
estimating a camera pose according to a camera pose function and a constraint function, wherein the camera pose function tracks a position and an orientation of a camera in time, and wherein the constraint function is based on coordinates of the first bounding contour and coordinates of the second bounding contour.

19. A method, implemented in a vehicle, comprising:
determining a first bounding contour based on a previous frame;
determining a second bounding contour based on a current frame, wherein the current frame is temporally subsequent to the previous frame;
estimating a camera pose according to a camera pose function and a constraint function, wherein the camera pose function tracks a position and an orientation of a camera in time, and wherein the constraint function is based on coordinates of the first bounding contour and coordinates of the second bounding contour; and
using the camera pose for navigating the vehicle, comprising:
obtaining a quantitative estimate of a movement of an adjacent vehicle; and
obtaining a movement of the camera.

20. An apparatus, comprising:
a processor; and
a memory comprising processor executable code, the processor executable code when executed by the processor causes the processor to:
determine a first bounding contour based on a previous frame;
determine a second bounding contour based on a current frame, wherein the current frame is temporally subsequent to the previous frame;
estimate a camera pose according to a camera pose function and a constraint function, wherein the camera pose function tracks a position and an orientation of a camera in time, and wherein the constraint function is based on coordinates of the first bounding contour and coordinates of the second bounding contour; and
use the camera pose for navigating a vehicle, comprising:
obtaining a quantitative estimate of a movement of an adjacent vehicle; and
obtaining a movement of the camera.

* * * * *